Patented Feb. 24, 1942

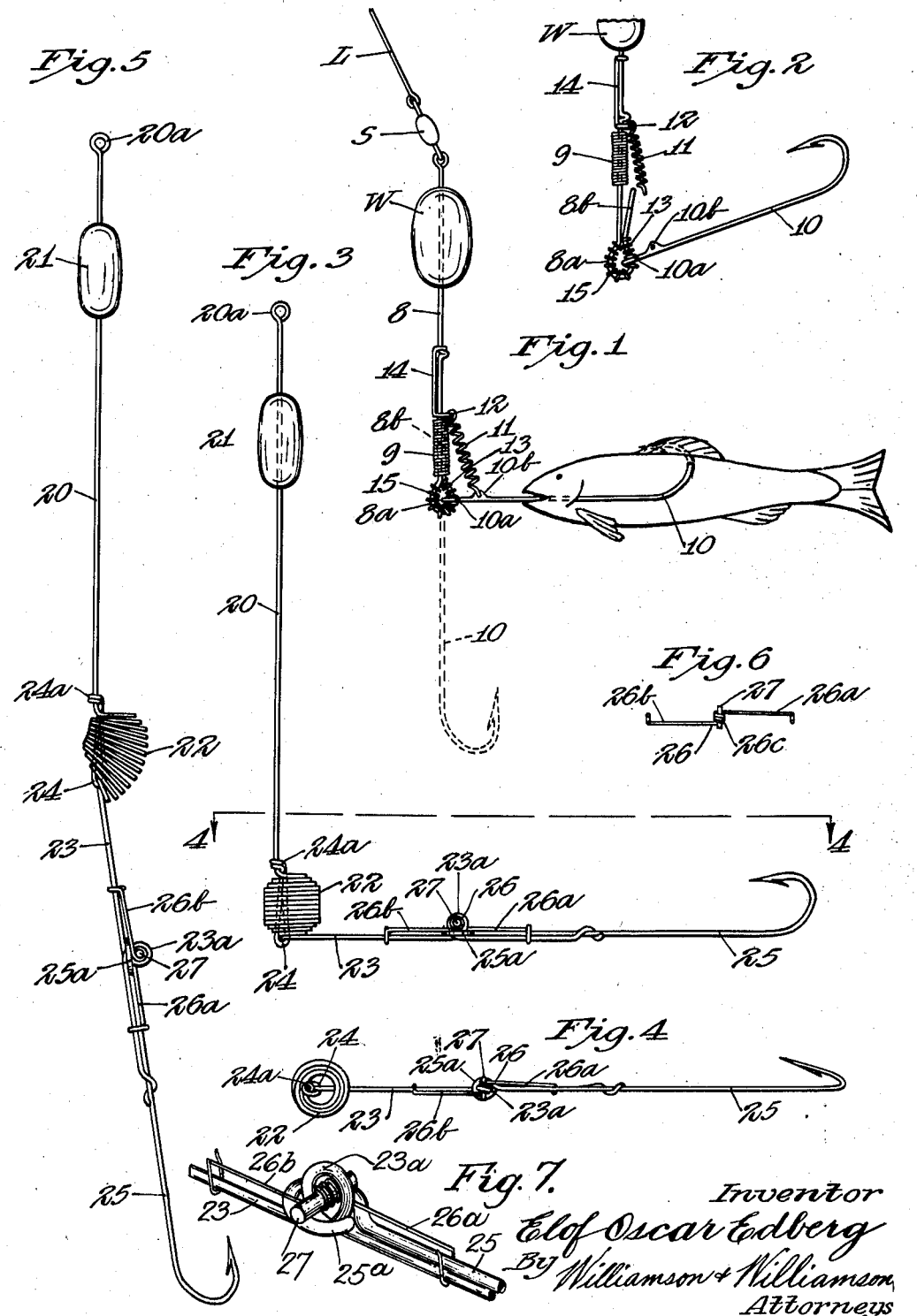

2,274,131

UNITED STATES PATENT OFFICE 2,274,131

FISHHOOK COUPLING

Elof Oscar Edberg, Willmar, Minn.

Application October 5, 1940, Serial No. 359,918

9 Claims. (Cl. 43—28)

This invention relates to fishhooks and couplings for connecting fishhooks with a fishing line.

At the present time most fishhooks are connected with the line so that their shanks are substantially aligned with the leader and line as the line is drawn through the water. Consequently, natural bait, such as minnows, frogs and the like and below surface plugs, are disposed in more or less vertical or upstanding position rather than in their normal, substantially horizontal position.

It is an object of my invention to provide a coupling for a fishhook wherein the shank of the hook will be normally maintained in a horizontal position, although when the hook is struck and a fish impaled thereon it will yieldingly assume a position in line with the leader or line to which it is attached.

It is a further object to provide a leader and coupling for a fishhook which causes the hook to be normally maintained in a position for holding the bait naturally and which further minimizes the chance of the hook fouling or becoming attached to obstacles at the bottom of the lake, and which further assists in the engagement of the hook with the fish's mouth when the bait is struck.

More specifically, it is an object to provide a fishhook and coupling of the class described wherein a leader link is provided of comparatively rigid material having connected with it a fishhook in such manner that the fishhook may have swingable relation to the leader link to vary angulation between the two, and further provided with simple resilient means associated with the parts to normally maintain the hook in a substantially horizontal position at right angles to the leader link, while permitting the hook when a fish is impaled, to assume a position substantially aligned with the leader link and the fishing line.

These and other objects and advantages of the invention will be more fully set forth in the following description made in connection with the accompanying drawing wherein like reference characters refer to the same parts throughout the several views, and in which:

Fig. 1 is a view showing a portion of a fishing line in a normal casting or trolling position, with the embodiment of my coupling, a fishhook and minnow attached thereto, the dotted lines indicating the position of the hook when a fish is caught and a pull transmitted to the line;

Fig. 2 is a view of the coupling and fishhook showing the manner of attachment of the hook to the leader link;

Fig. 3 is a side elevation showing a somewhat different form of the invention with the fishhook disposed in the normal, substantially horizontal position;

Fig. 4 is a cross section taken on the line 4—4 of Fig. 3;

Fig. 5 is a side view of the form of the invention shown in Fig. 3, with the hook disposed substantially in alignment with the leader link in the position it assumes when a fish is caught and a pull imposed upon the line;

Fig. 6 is a detail view showing an attachment clip for rigidly securing a fishhook to the attachment link of the device of Figs. 3 to 5, inclusive, and Fig. 7 is an enlarged detail perspective view showing the attachment clip of Fig. 6 operatively applied.

In the form of the invention shown in Figs. 1 and 2, a fish line L of conventional type is shown having attached to the outer end thereof a conventional swivel S. To this swivel is attached a leader link 8 of suitable semi-rigid material such as stiff wire. Leader link 8, as shown, has a weight W superimposed and clinched, or otherwise rigidly secured to the upper portion thereof, although this is optional as the weight for the line may be applied to the line above link 8. The leader link is bent at its lower portion upon itself to form an eye 8a and an upwardly extending extremity 8b which, as will be later shown, serves to lock the hook thereon. For such locking function suitable means such as a thin coil spring 9 is provided surrounding the lower portion of link 8 and adapted to be compressed upwardly and then slipped over the extremity 8b to lock the same with the body of the link in closed position with an eye 10a of a fishhook 10 disposed thereon. A light coil spring 11 is affixed at its upper end to an eye 12 suitably connected with the leader link 8 above retaining spring 9, and the lower end of this coil spring is connected with fishhook 10 a short distance below the eye 10a of the fishhook and, as shown, in an apertured lug 10b provided by the specially constructed fishhook. The spring 11 is under tension when connected with the parts 12 and 10b, and yieldingly swings the shank of fishhook 10 upwardly, its upward movement being limited as shown by a small cushioning coil spring 13 which is disposed on the loop portion of the lower end of leader link 8 above the eye of fishhook 10 and held in place by the retaining spring 9. The eye 12 to which spring 11 is connected at its upper end may be integrally formed with a wire clip 14 which is wrapped around and connected with leader link 8 just below weight W.

To prevent swinging of hook 10 beyond center position when a fish or other weight is impaled on the hook through the influence of spring 8b a coil counter spring 15 is disposed on the eye 8a of the leader link interposed between the retaining spring 9 and the eye 10a of the hook.

In operation when the line is being drawn as in trolling or in reeling in or retrieving during casting, the hook 10 will be disposed in the position shown in Fig. 1, with its shank substantially horizontally and more or less at right angles with the leader link 8, the barb of the hook, it will be noted, being disposed above the shank rather than depending below. The minnow or other natural bait, or a plug or other lure is thus drawn through the water in natural, more or less horizontal position. The disposition of the barb of the hook above the shank and lower portion of the bait minimizes the tendency of the hook to snag on irregularities on the bottom of the lake or body of water fished. The movement of the bait in its natural or normal course, of course, more readily attracts a fish and with an artificial lure presents a more realistic movement of the lure through the water. Another function of my improved device is that if a fish strikes at the bait and immediately thereafter opens its mouth, as is often the case, the first strike swings the hook downwardly to some extent and the subsequent release causes the barb of the hook to be forcibly projected upwardly against the upper portion of the fish's mouth, thereby increasing the chance of hooking a wary fish. Various hooks and plugs may be readily attached by compressing the coil spring 9 upwardly and releasing the retaining element 8b of the loop portion of the bent leader link, and, it will be noted, that it is also necessary to remove the small cushioning spring 13 before another hook or lure is attached.

In the form of the invention shown in Figs. 3 to 6, inclusive, the structure is somewhat simplified as contrasted with the form first described. Here the leader link 20 constructed of relatively rigid but resilient material is provided with an eye 20a at its upper end for attachment to a line or swivel and, as shown, although the same is not necessary, has the weight 21 clinched or otherwise attached to the upper portion thereof. The leader link 20 is extended, as shown, and coiled at its lower end to form a relatively heavy coil spring 22 which is permissive of swinging action between the link 20 and the further extension 23 or hook connecting arm, as shown also integrally formed with the material of leader link 20, the relatively stiff wire being bent so that the hook connecting arm 23 normally is disposed at right angles to leader link 20. As shown, the coil spring 22 is confined or held against longitudinal extension by means of a looped wire 24 which surrounds the lowermost convolution of spring 22 and is attached to the lowermost part of link 20 just above the uppermost convolution of spring 22 by twisting 24a or other suitable means.

Suitable means for rigidly connecting a hook or artificial lure with the swingable connecting arm 23 are provided and, as shown in the drawing, consist in a small loop 23a extending laterally from the connecting arm 23 some distance above the lower end of the arm which is of a size to pass through the eye 25a of the fishhook 25. A retaining clip, indicated as an entirety by the numeral 26, is provided for locking the parts in place and rendering the connection rigid. This clip consists in a substantially straight member having its ends 26a and 26b offset one from the other and leaving a short central portion 26c angled at 90 degrees with respect to the ends, and which portion, as shown, is coiled about and soldered or otherwise connected with a very small pin 27 for making rigid the central portion. The extremities of clip 26 are turned to form hooks and the clip is made preferably of a thin wire to enable one end thereof to be passed through the eye 23a on the outer side of the larger eye 25a of the hok to retain the same while the extremities of the clip are hooked about the connecting arm 23 at points some distance above and below the eye 23a, respectively.

With the construction described it will be apparent that the shank of hook 25 is rigidly affixed to the lower portion of the connecting arm 23 and will swing in unison with that arm.

In the operation of the last described form of the invention the connecting arm and hook are normally carried in substantially horizontal position, as in the form first described, and have all of the functions of the hook in the first form. When a fish is caught the coil spring will yield, as shown in Fig. 5, the hook connecting arm and hook then assuming a substantially aligned position with the leader link 20 to facilitate playing of the fish and reeling the fish into the boat.

From the foregoing description it will be seen that I have invented a quite simple, but highly efficient coupling and leader for a fishhook or artificial bait which is adapted to cause the bait to be maintained in a natural moving position attracting more fish, and which, furthermore, minimizes snagging of the hook as well as increases the chance of hooking a fish when the bait is struck.

In the appended claims the term "shank extension" is used in its broad sense to include an elongated shank of a fishhook, the arm or shank extension 23 of Fig. 5, or the shank extension formed by the body of an artificial bait or lure.

It will, of course, be understood that various changes may be made in the form, details, arrangement and proportions of the parts without departing from the scope of my invention, which, generally stated, consists in a device capable of carrying out the objects above set forth and in the novel parts and combinations of parts disclosed and defined in the appended claims.

What is claimed is:

1. The combination with a fishhook having a shank rigidly connected therewith and a fishing line of, a leader link constructed of relatively stiff material, means for connecting said fishhook with said leader link with freedom for relative swinging of said fishhook to vary the angulation of the shank of said fishhook relatively to said link, and yieldable means for normally maintaining said shank in a position angled substantially with reference to said link while permitting said hook to swing to a position substantially aligned with said link when a pull is imposed upon said hook.

2. The combination with a fishhook having a shank rigidly connected therewith and a fishing line of, a leader link constructed of relatively stiff material, means for connecting said fishhook with said leader link with freedom for relative swinging of said fishhook to vary the angulation of the shank of said fishhook relatively to said link, and a spring connected with said leader link for normally maintaining the shank of said hook in a position angled respectively with reference to said link, while permitting said hook to swing to a position substantially aligned with said link when a pull is imposed upon said hook.

3. The combination with a fishhook and a fishing line of, a leader link constructed of relatively stiff material and adapted for attachment to said line, a member swingably connected with said leader link to vary the angulation between said members, said last mentioned member having at its outer end the outer portion including the hook and barb of a fishhook, and a contractile resilient element connecting a point on said leader link above said swingable connection with a point on said member below said connection for normally maintaining said member in a position angled substantially with reference to said link while permitting said member to swing to a position substantially aligned with said link when a pull is imposed upon said hook.

4. The combination with a fishhook and a fishing line of, a leader link constructed of relatively stiff material and adapted for attachment to said line, said link having an attachment eye at the lower end thereof, a fishhook having a shank extension swingably connected with said eye, a contractile coil spring connecting said link at a point above said eye with said shank extension for normally maintaining said hook angled substantially with reference to said link, and means associated with said eye for preventing said shank extension from swinging past dead center position with reference to said link.

5. The structure set forth in claim 4, and said last mentioned means constituting a coil spring surrounding a portion of said eye and interposed between said shank extension and the upper end of said eye.

6. The combination with a fishhook and a fishing line of, a leader link constructed of relatively stiff material and adapted for attachment to said line, a coil spring having one of its ends rigidly connected with the lower end of said leader link and with its axis disposed substantially parallel to said link, and a fishhook having a shank extension rigidly connected with the other end of said coil spring and extending normally at a substantial angle to said link, said spring permitting swinging movement of said fishhook substantially in a common plane with said link when a pull is imposed on said hook.

7. The structure set forth in claim 6, and a confining member secured to the lower portion of said link and surrounding at least the lower convolution of said spring to provide a pivotal connection with said shank extension and to limit expansion of said coil spring.

8. The combination with a fishhook and fishing line of, an elongated spring member having its upper end adapted for attachment to said line and the upper portion thereof being substantially straight to form a leader link, the intermediate portion of said elongated member being coiled to form a coil spring and the lower portion of said member being substantially straight and normally extending and maintained from said coil spring portion at a substantial angle to said link portion, and a fishhook rigidly connected with said shank extension.

9. A fishhook coupling comprising, a substantially straight leader link, an elongated shank member connected with said leader link with freedom for swinging relative thereto in a common plane, a spring element connecting said leader link with said shank member for normally retaining said shank member approximately at right angles to said leader link while permitting said shank member to swing to a position substantially aligned with said link, said shank member terminating in a hook rigidly connected therewith, said hook having a barb, the axis of which is disposed in substantially side-by-side arrangement with said shank member.

ELOF OSCAR EDBERG.